US009192171B2

(12) United States Patent
Autry

(10) Patent No.: US 9,192,171 B2
(45) Date of Patent: Nov. 24, 2015

(54) APPARATUS AND METHOD FOR SKINNING AND REMOVING USABLE MEAT FROM A LARGE GAME ANIMAL CARCASS

(71) Applicant: Bill Autry, Guy, AR (US)

(72) Inventor: Bill Autry, Guy, AR (US)

( * ) Notice: Subject to any disclaimer, the term of this patent is extended or adjusted under 35 U.S.C. 154(b) by 0 days.

(21) Appl. No.: 13/815,999

(22) Filed: Mar. 21, 2013

(65) Prior Publication Data

US 2014/0287668 A1    Sep. 25, 2014

(51) Int. Cl.
*A22B 5/16*  (2006.01)
*A22B 5/08*  (2006.01)

(52) U.S. Cl.
CPC ........................................ *A22B 5/08* (2013.01)

(58) Field of Classification Search
USPC .................. 452/125, 127–130, 132, 133, 185, 452/187–192, 197
See application file for complete search history.

(56) References Cited

U.S. PATENT DOCUMENTS

| | | | | |
|---|---|---|---|---|
| 2,536,268 | A * | 1/1951 | Dillon | 452/194 |
| 3,280,869 | A * | 10/1966 | Harrington et al. | 452/126 |
| 3,371,375 | A * | 3/1968 | Bartel | 452/128 |
| 3,894,311 | A * | 7/1975 | Johnson | 452/128 |
| 4,299,009 | A * | 11/1981 | Tournier | 452/128 |
| 5,279,518 | A * | 1/1994 | Ekiss et al. | 452/128 |
| 5,336,124 | A * | 8/1994 | Garside | 452/125 |
| 5,626,514 | A * | 5/1997 | Rothove | 452/128 |
| 5,782,684 | A * | 7/1998 | Shaff | 452/128 |
| 7,625,269 | B2 * | 12/2009 | Godwin | 452/129 |
| 8,574,042 | B1 * | 11/2013 | Sloan et al. | 452/128 |
| 2002/0094771 | A1 * | 7/2002 | Butler | 452/128 |

* cited by examiner

*Primary Examiner* — Richard Price, Jr.

(57) ABSTRACT

An improved apparatus and method for skinning large game animals is used by fastening the animal head to an upright at one end of the apparatus structure, making incisions at and cuts around the neck and attaching to the skin the end of a cable from a manually powered windlass mechanism mounted on an upright at the opposite end of the structure. As the windlass is operated the skin is drawn back over and off the carcass and the carcass is brought to a near horizontal position in open space between the two end upright parts of the structure. Two extensions are then swung into place along the animal's hind legs and attachments are made to the leg tendons. The skinned hide is then removed from the hind legs. The carcass is thus secured in a convenient and sanitary position for removing usable meat.

10 Claims, 3 Drawing Sheets

APPARATUS AND METHOD FOR SKINNING AND REMOVING USABLE MEAT FROM A LARGE GAME ANIMAL CARCASS

This application relies on priority in Provisional Application 61/686,534 filed on Apr. 6, 2012 of the same title and agent docket number.

BACKGROUND OF INVENTION

Field of the Invention

This invention was conceived as an improvement over prior art apparatus and methods used in skinning and removal of usable meat from large game animals. Said apparatus facilitates the method of restraining the head of the carcass and making attachment to the skin at the neck after it has been cut around and away from the neck and then removing the skin from the carcass by applying force to an attachment to the skin in a direction away from the head and to the rear of the carcass. After the skin is removed the usable meat can then be removed. The apparatus and method thus contribute in facilitating convenience and sanitation in the skinning and meat removal process.

The prior art known to the inventor of pertinence are U.S. Pat. Nos. 5,336,124 and 5,782,684. Patent 124 by Garside is for a fairly rudimentary field expedient requiring some improvisation and is lacking in control and sanitation. The animal head is attached to a tree and attachment is made to the skin at the neck after the skin is cut from the neck and then the attachment to the skin is attached to a motor vehicle and the skin is pulled from the carcass as the vehicle is driven a short distance away. A wrap around game bag is placed beneath the carcass which is intended to be wrapped around the carcass to take it away for the remaining butchering process of meat removal. The virtue of Garside is the minimal amount of hardware necessary to rig the carcass to a solid object and to the movable vehicle, however, it is not a self-contained apparatus but a collection of things that must be gathered and rigged to operate in unison.

Patent 684 by Shaff is for a self-contained apparatus but it has a feature that is unnecessary, adds extra weight, and is conducive to being unsanitary. The apparatus has two racks to its structure. The animal is placed on the upper rack where the skin is removed from it, the skin being transported to the lower rack. The contact the animal carcass makes with the rack is unnecessary and unsanitary. The apparatus of the present invention is constructed having no racks for the carcass to contact, the carcass being suspended in mid-air yielding complete access to it for the butchering process. The construction of the present invention yields a much lighter and more portable apparatus. It is more sanitary and gives better access for meat removal.

SUMMARY OF THE PRESENT INVENTION

The present invention solves the problems in the prior art. By being self contained it overcomes the problems of Garside. By not having heavy racks on which the carcass and skin are placed it is lighter, more portable, and gives better access for the process of removing usable meat from the carcass in a more sanitary fashion, it is an improvement over Staff.

The present inventions accomplishes the purpose of skinning and removing usable meat by having two ends structures connected by structure at ground level. One end structure has provision for attaching the animal head while the other end structure has provision for attachment to the skin and pulling it away from and off the animal carcass leaving the carcass suspended in mid-air for ready access for the butchering process.

DESCRIPTION OF THE PREFERRED EMBODIMENT

Figure 1:
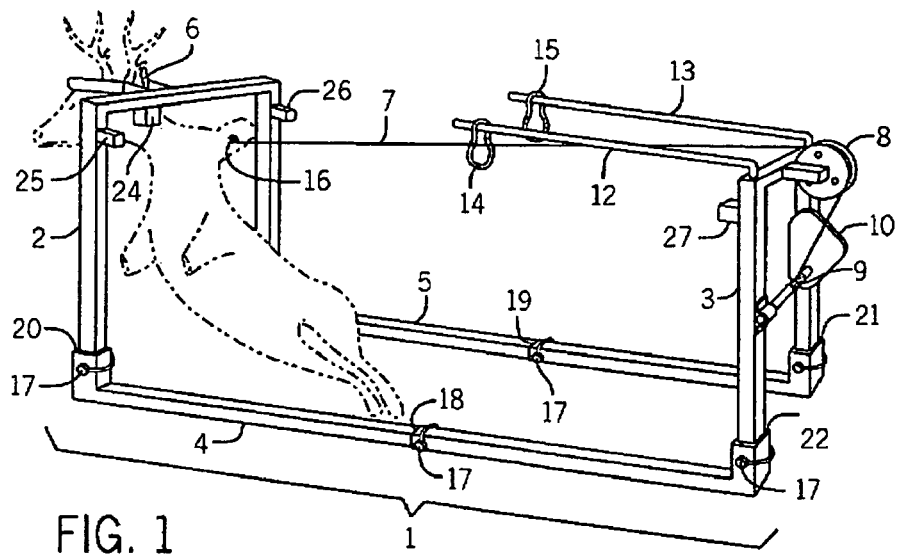
FIG. 1 is a perspective view from the left side of the invention showing the position of the animal carcass at the start of the skinning process.
Figure 2:
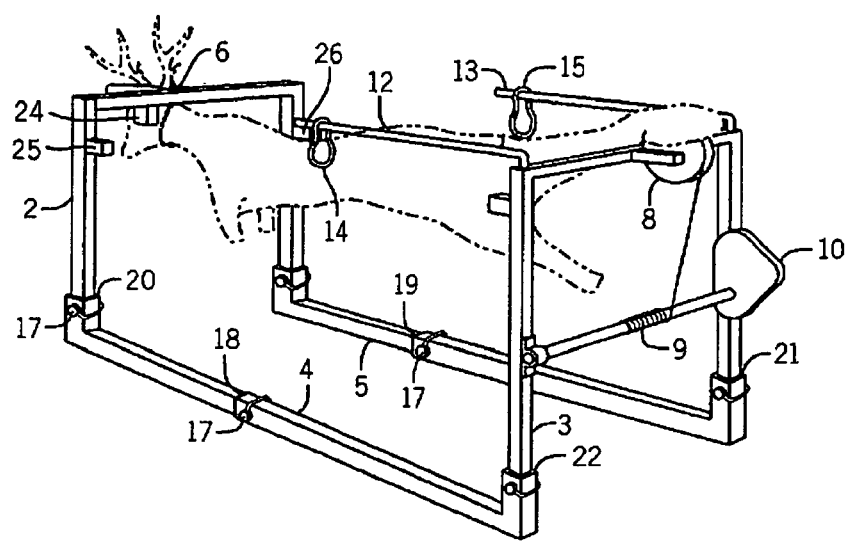
FIG. 2 is a perspective view from the left side of the invention showing the position of the animal at the end of the skinning process.
Figure 3:
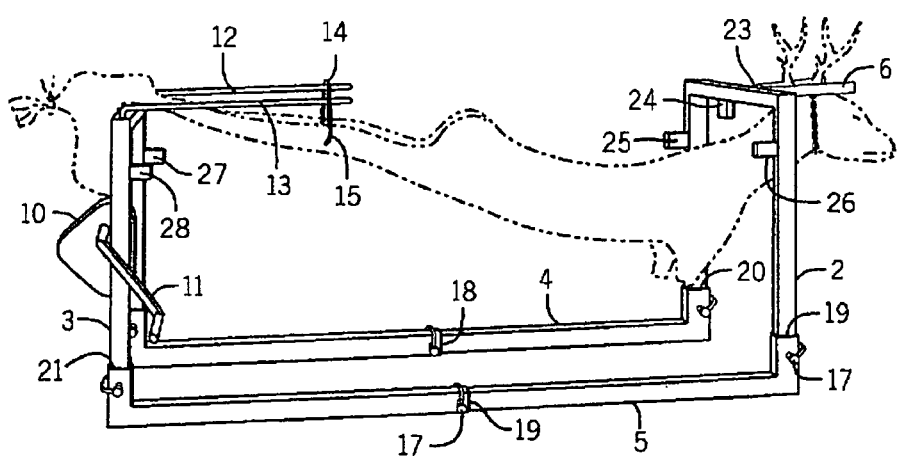
FIG. 3 is a perspective view from the right side of the invention showing the position of the animal carcass after the skin has been removed.
Figure 4:
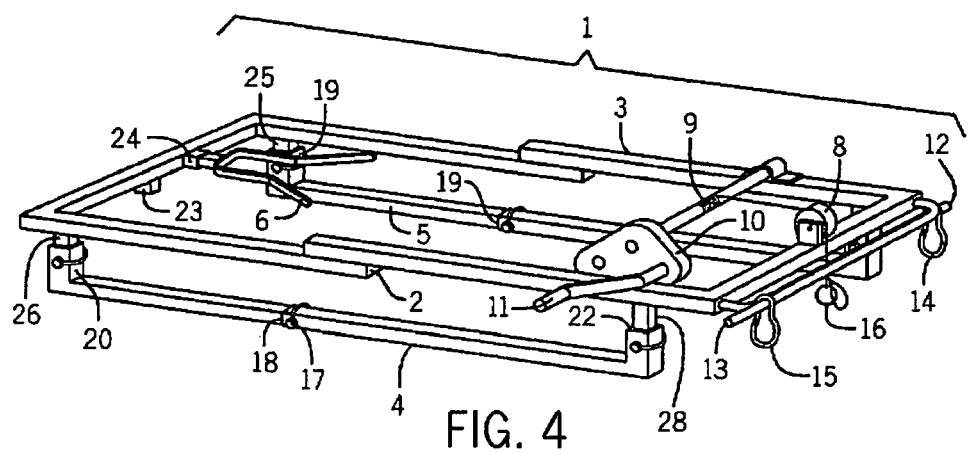
FIG. 4 is a perspective view showing the invention in stowed assembly.
Figure 5:
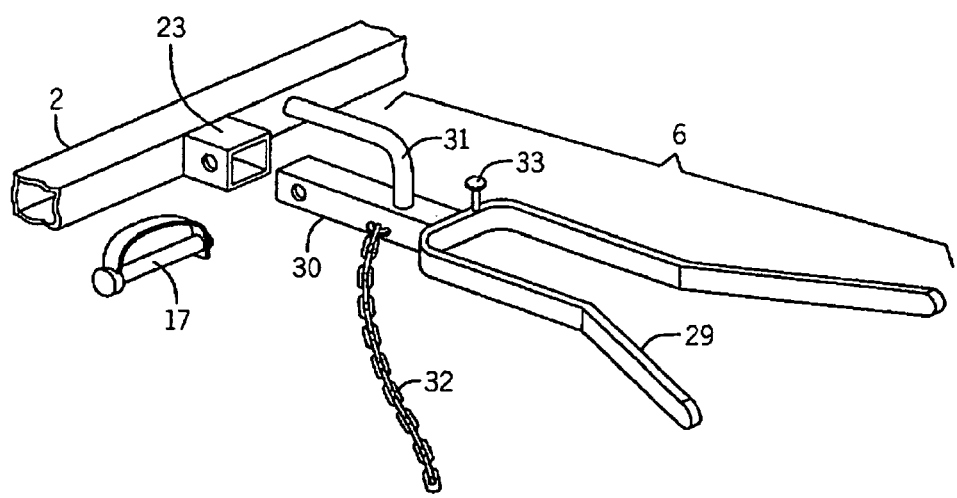
FIG. 5 is a perspective view of the head locating and fastening means.

With reference to the drawings, the preferred embodiment of the present invention is comprised of frame 1 having a front upright structure 2 and having opposite at the rear a similar upright structure 3, said frame 1 having horizontal structural members 4 and 5 connecting said upright structures 2 and 3 at or near the ground level. At the upper part of the first upright structure 2 there is a head locating and fastening means 6 for positioning and holding the head of the animal carcass and on the other upright structure 3 is a cable, or rope, 7 which is guided over roller 8 to reel 9 which is connected to gear box 10 having hand crank 11 for manually reeling in cable 7. At the top of upright structure 3 outboard of where cable 7 and reel 9 are positioned are swingable extension means 12 and 13 having at their distal ends attachments 14 and 15 to which the rear legs of the animal are be attached. On the end of cable 7 is fastening means 16 affixed for attaching cable 7 to the animal skin at the neck. The invention is employed by positioning and fastening the head to upright structure 2 in head locating and fastening means 6 with the back of the animal oriented upward. After making appropriate incisions in the skin at the neck cable 7 is reeled out from upright structure 3 and attached to the animal skin at or near the incision on the body side of the incision with attachment means 16. Crank handle 11 is rotated manually whereby the skin is pealed off the carcass and back over the hind legs for removal. This procedure raises the carcass to a near horizontal position at which point swingable extension means 12 and 13 are swung into position along side the carcass and attachments 14 and 15 are affixed to tendons in the hind legs.

The animal carcass is now fixed suspended horizontally at a convenient working height for removing the usable meat by conventional butchering techniques. By using the present invention the skinned carcass does not contact the ground, and contacts the apparatus only at the head and hind legs thereby maintaining the carcass in a sanitary condition.

The preferred embodiment is adjustable in length by having telescoping means in members 4 and 5, adjustment being effected by repositioning retainer pins 17 at joints 18 and 19 through alignment holes spaced along said members 4 and 5.

The preferred embodiment may be partially disassembled by pulling retainer pins 17 at joints 19, 20, 21, and 22 at the lower ends of vertical structures 2 and 3. The head locating and fastening means 6 is re-locatable by pulling one said retaining pin 17 at socket 23 and reinstalling said head location and fastening means 6 into socket 24 and replacing said pin 17. A more compact assembly can then be effected for transport and storing by laying first upright structure 2 along horizontal structural members 4 and 5 such that protrusions 25 and 26 enter joints 19 and 20 and inserting pins 17. Upright structure 3 is then laid along horizontal structural members 4 and 5 so protrusions 27 and 28 enter joints 21 and 22 and pins 17 are inserted.

The head and neck of the animal may be secured in the head locating and fastening means 6 while means 6 is pinned to the front upright structure 2 by pressing the neck between flexible bars 29 of said head locating and fastening means 6, forming flexible bars 29 to the neck and looping chain 32 over top of flexible bars 29 and under the neck and attaching a chain link to retainer post 33.

Alternatively, the head locating and fastening means 6 may be removed from the front upright structure 2 and attached to the animal in the above described manner then means 6 with animal attached is lifted, with aid of handle 31, and reattached to structure 2 at socket 23 with pin 17.

The present invention overcomes the deficiencies in the prior art by combining all necessary components in a self-contained unit as compared to Garside, and for suspending the animal carcass above the ground in such position that the skinned carcass does not touch the frame members or the ground as compared with Staff, thereby maintaining the carcass in a sanitary condition.

While the best mode presently contemplated for carrying out the invention has been disclosed and explained in this preferred embodiment it will be apparent that modifications and variations of the apparatus and method may be made without departing from what is the subject matter of this invention.

What is claimed:

1. An apparatus for removing the skin from the carcass of a large game animal and positioning said skinned carcass for removing usable meat, the apparatus comprising:
   a frame having first and second generally vertical upright structures spaced opposite each other and a generally horizontal structure at or near ground level connecting said first and second upright structures;
   means connected to an upper part of the first upright structure for positioning and fastening the animal's head to said first upright structure;
   a reel connected to the second upright structure, said reel being rotatable by a hand crank; and
   a cable which is wound around the reel, said cable having an end which is attachable to the skin of the neck area of the animal for withdrawing the skin from the animal carcass;
   wherein in operation of the apparatus the animal's head is secured to the first upright structure, the cable is extended over an upper part of the second upright structure and attached to a portion of the skin which has been cut away from the neck, and the skin is withdrawn from the carcass by rotating the hand crank; and
   wherein the frame is configured such that, as the skin is withdrawn from the carcass, the cable will elevate the hind legs of the animal to a generally horizontal position above said horizontal structure.

2. An apparatus as in claim 1, wherein the horizontal structure connecting the first and second upright structures is adjustable in length to accommodate animals of various size.

3. An apparatus as in claim 1, wherein the frame comprises a number of connecting points which are configured to permit the upright structures and the horizontal structure to be connected together into a sufficiently reduced volume for portability and storage.

4. An apparatus as in claim 1, wherein the end of the cable is formed into a choker loop and is attached to the portion of the animal skin at the neck by inserting a ball inside the skin, forming the skin around the ball and drawing the choker loop, over the skin around the ball.

5. An apparatus as in claim 1, wherein the means for positioning and fastening the animal's head comprises a pair of flexible bars which are configured to be positioned around the animal's neck and are disconnectable from the first upright structure, wherein the bars may be secured around the animal's neck and then lifted and re-connected to the first upright structure with animal's head attached thereto.

6. An apparatus for removing the skin of a game animal, the apparatus comprising:
   first and second spaced-apart upright structures which are connected together by a number of elongated horizontal members;
   a head fastener for securing the animal's head to an upper end portion of the first upright structure;
   a reel which is connected to the second upright structure;
   a cable which is wound upon the reel, the cable being guided over an upper end portion of the second upright structure and having an end which is connectable to the skin; and
   first and second spaced-apart leg support members which are connected to the upper end portion of the second upright structure and are connectable to respective ones of the animal's legs;
   wherein in use of the apparatus the animal's head is secured to the head fastener, the cable is connected to a portion of the animal's skin which has previously been cut away from the animal's neck, and the reel is rotated to draw the cable towards the upper end portion of the second upright structure to thereby both pull the hide off of the animal and elevate the animal's legs toward the first and second leg support members; and
   wherein with the animal's legs connected to the first and second leg support members, the animal's skinned carcass is suspended in a generally horizontal position between the first and second upright structures.

7. The apparatus of claim 6, wherein the head fastener is disconnectable from the first upright support such that the head fastener may be secured to the animal's head and then reconnected, with the head secured thereto, to the upper end portion of the first upright structure.

8. The apparatus of claim 7, wherein the head fastener comprises a handle to facilitate lifting the head fastener, with the head secured thereto, to the upper end portion of the first upright structure.

9. The apparatus of claim 6, wherein the first and second leg support members are pivotally connected to the upper end portion of the second upright structure.

10. A method for removing the skin of a game animal, the method comprising:
   providing first and second spaced-apart upright structures;
   securing the animal's head to the first upright structure;
   connecting a cable to a portion of the animal's skin which has previously been cut away from the animal's neck;
   drawing the cable toward the second upright structure to thereby pull the skin off of the animal's carcass from the neck to the animal's hind legs;
   wherein the pulling of the skin off of the animal's carcass will lift the hind legs to an elevated position; and securing the hind legs in the elevated position to thereby suspend the carcass in a generally horizontal position between the first and second upright structures.

* * * * *